L. VAN GULCK.
FURNACE FOR TREATING ZINC.
APPLICATION FILED JULY 21, 1917.

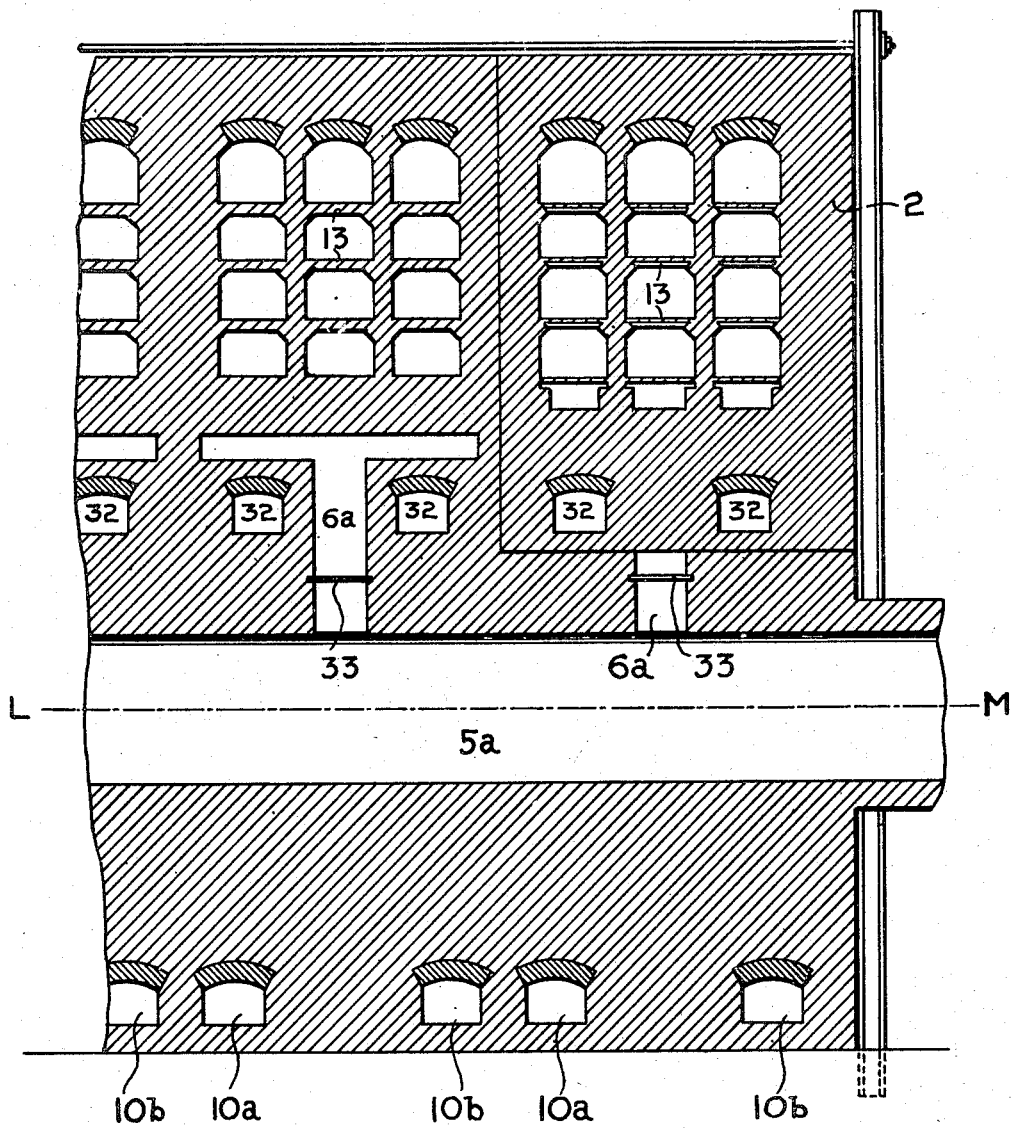

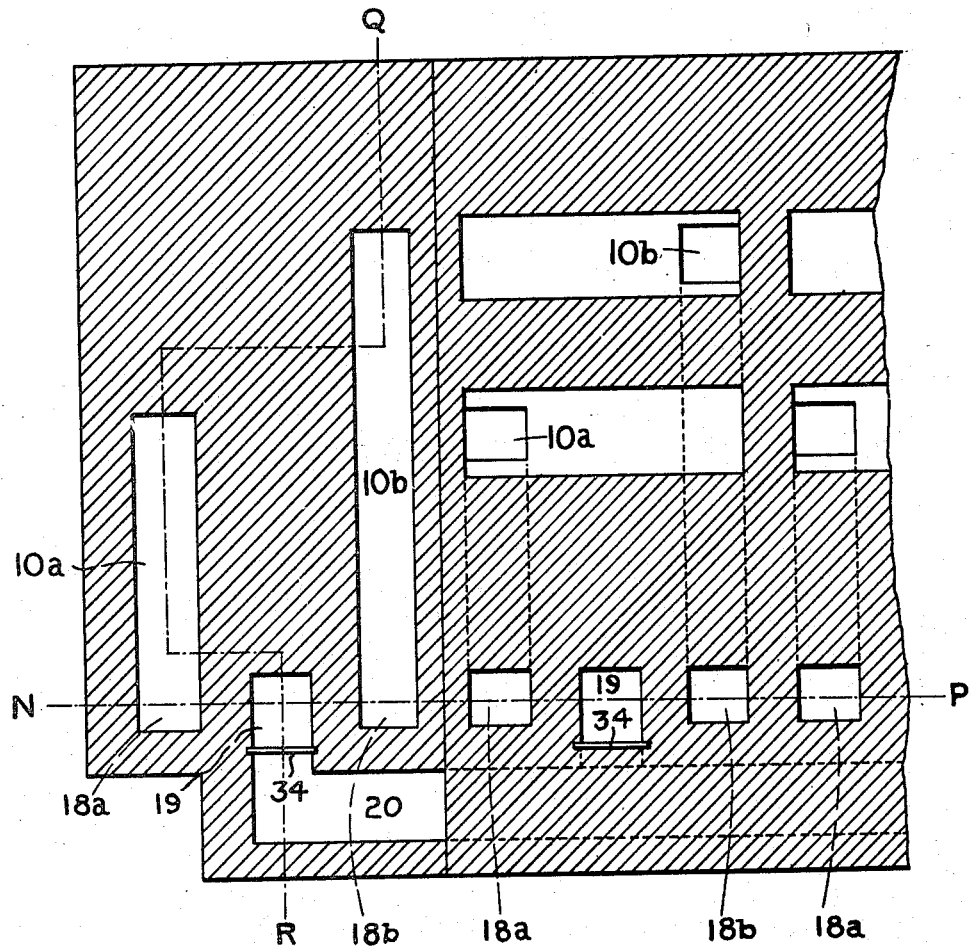

1,280,593.

Patented Oct. 1, 1918.
6 SHEETS—SHEET 5.

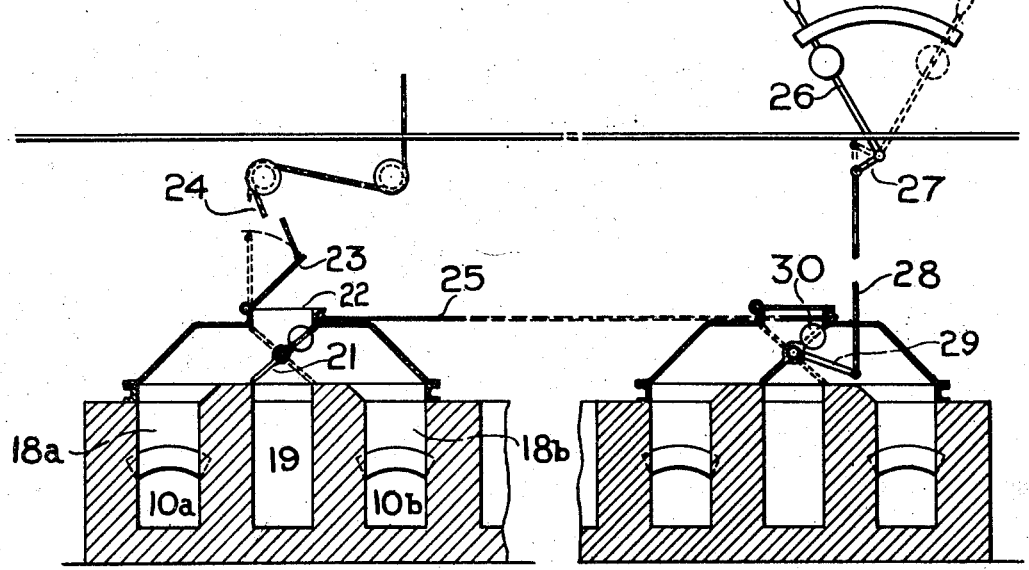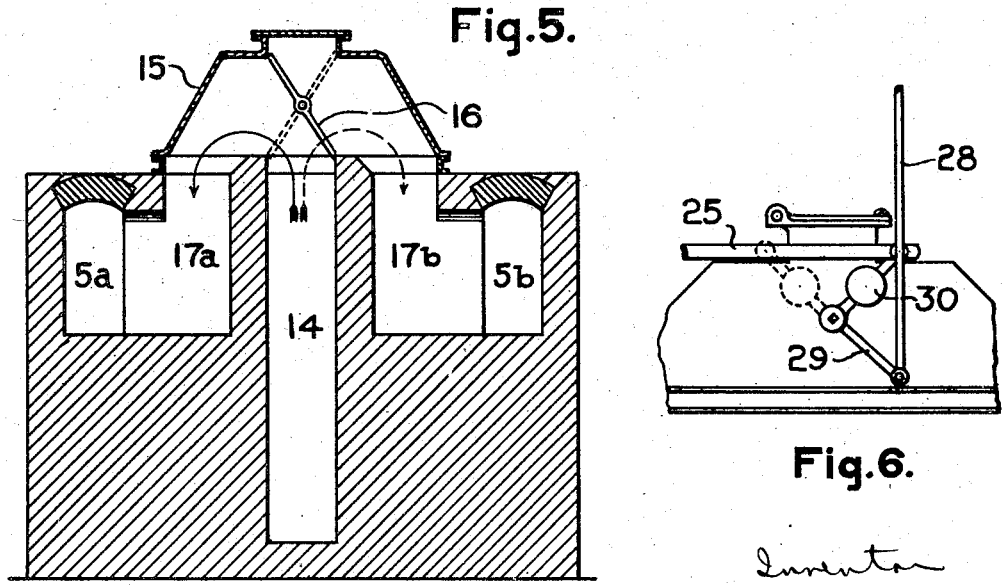

UNITED STATES PATENT OFFICE.

LÉOPOLD VAN GULCK, OF UPLANDS, SWANSEA, WALES.

FURNACE FOR TREATING ZINC.

1,280,593.  Specification of Letters Patent.   Patented Oct. 1, 1918.

Application filed July 21, 1917. Serial No. 181,980.

*To all whom it may concern:*

Be it known that I, LÉOPOLD VAN GULCK, a subject of the King of the Belgians, residing at Uplands, Swansea, in the county of Glamorgan, Wales, have invented certain new and useful Improvements in Furnaces for Treating Zinc; and I do hereby declare the following to be a full, clear, and exact description of the invention, such as will enable others skilled in the art to which it appertains to make and use the same.

This invention relates to a furnace, more particularly intended for the treatment of zinc, which furnace can be worked in a more continuous manner, is more economical and efficient than and possesses other important advantages as compared with furnaces for the same purpose as at present constructed.

The principal object of the invention is to so construct a furnace of the gas heated reversible type, in sections that one or more sections can be readily repaired without it being necessary to stop the working of the whole furnace, thus securing more continuous working than is at present the case, it being only necessary to disconnect or insulate one of the sections from the rest of the furnace for repair or other purposes.

A further object of the invention is to provide means for insuring that the retorts in which the ore is being treated are subjected to practically uniform heat, in whatever portion of the furnace they may be located.

A further object of the invention is to so construct the furnace and arrange the mechanism for the reversal of the air and gas that perfect control of the working is secured.

Other objects of the invention will be explained more fully hereafter in the specification.

And in order that my said invention may be more clearly understood I will now proceed to describe the same with reference to the drawings which accompany this specification, which show, merely by way of example a reversible gas heated furnace, suitable for the treatment of zinc, and constructed according to my invention.

The furnace illustrated is provided with four double compartments, but it will be understood that a smaller or greater number of compartments may be provided.

Figure 1 is a vertical transverse section, taken on the line Q R of Fig. 3, through one of the compartments.

Figs. 2 and 2^A show a longitudinal section of the four compartments. With regard to Fig. 2 the section as to the left hand compartment is taken on the line A B, Fig. 1, as to the next compartment on the line B D Fig. 1; while as regards Fig. 2^A, the section as to the left hand compartment is taken on the line E F Fig. 1, and as to the right hand compartment on the line G F Fig. 1.

Figs. 3 and 3^A are corresponding sectional plans. In Fig. 3 the plane of section is indicated by H K, Fig. 2; while in Fig. 3^A, the plane of section is indicated by L M on Figs. 1 and 2^A.

Figs. 4 and 4^A are longitudinal sections, Fig. 4 being taken on the line N P Fig. 3 and Fig. 4^A being taken on the line S T, Fig. 3, illustrating the reversing air valve.

Fig. 5 is a detail hereinafter referred to, showing the reversing gas valve, the plane of section being U V in Fig. 3^A.

Fig. 6 is a detail of the operating mechanism of the reversing air valve.

The same numerals and letters of reference are employed to denote the same parts in all the views.

The furnace consists as previously stated in the present case of four compartments, bounded by side walls 1 and transverse and end walls 2, and divided into double compartments by means of a central wall 3 extending almost to the roof or vault 4. $5^a$ and $5^b$ are passages or channels extending along each side of the furnace, and along all the compartments, and each compartment is provided with a smaller channel, chimney or flue $6^a$ or $6^b$ leading from the channel $5^a$ or $5^b$ to a combustion or mixing chamber $7^a$ or $7^b$.

In the lower part of each section of the double compartments is also located a regenerating chamber $8^a$ or $8^b$ of the usual construction. This chamber communicates by a passage $9^a$ or $9^b$ with the mixing chamber or combustion chamber $7^a$ or $7^b$.

Figure 1:
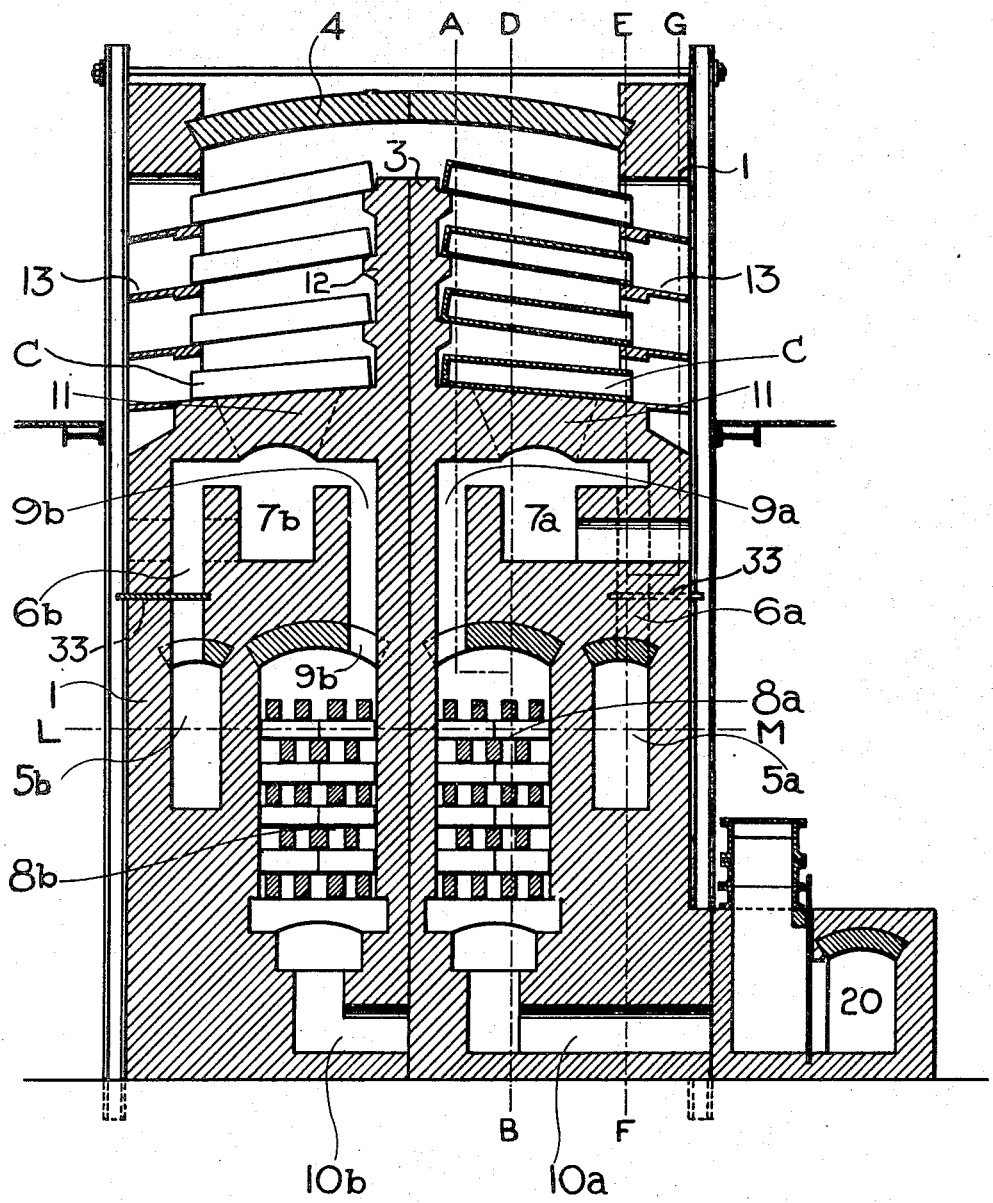

Below each of the compartments are passages $10^a$ and $10^b$, the passage $10^a$ communicating with the lower part of the regenerator $8^a$, and the passage $10^b$ with the lower part of the regenerator $8^b$ as shown at Fig. 1. These passages extend to the air valve chamber and to the passage to the chimney, as explained more fully hereafter with respect to Figs. 4 and 4A.

In each compartment above the mixing or combustion chamber 7 or 7ª are provided shelves or the like 11, upon which the lower rows of crucibles C rest, sufficient space being left between the shelves or the like for the heated gases to pass between them. 12 are projecting ledges forming niches in the wall 3 and 13 are other ledges or shelves on the outer faces, the ends of the retorts rest on the supports 12 and 13.

The passages 5ª and 5ᵇ are in connection with a single gas valve, by the operation of which the gas may be turned into either of the passages and consequently into all the compartments at one side of the furnace at the same time.

The arrangement is shown in greater detail at Fig. 5 in which 14 is the principal inlet passage for the gas. 15 is a cover or housing in which is suitably mounted the pivoted valve 16. It will be seen that when the valve is in the position shown in full lines the gas is diverted through the passage 17ª to the main passage 5ª extending along one side of the furnace, while when the valve is in the position shown in dotted lines the gas is diverted through the passage 17ᵇ to the passage 5ᵇ extending along the other side of the furnace as shown by the dotted arrow.

Figure 3A:
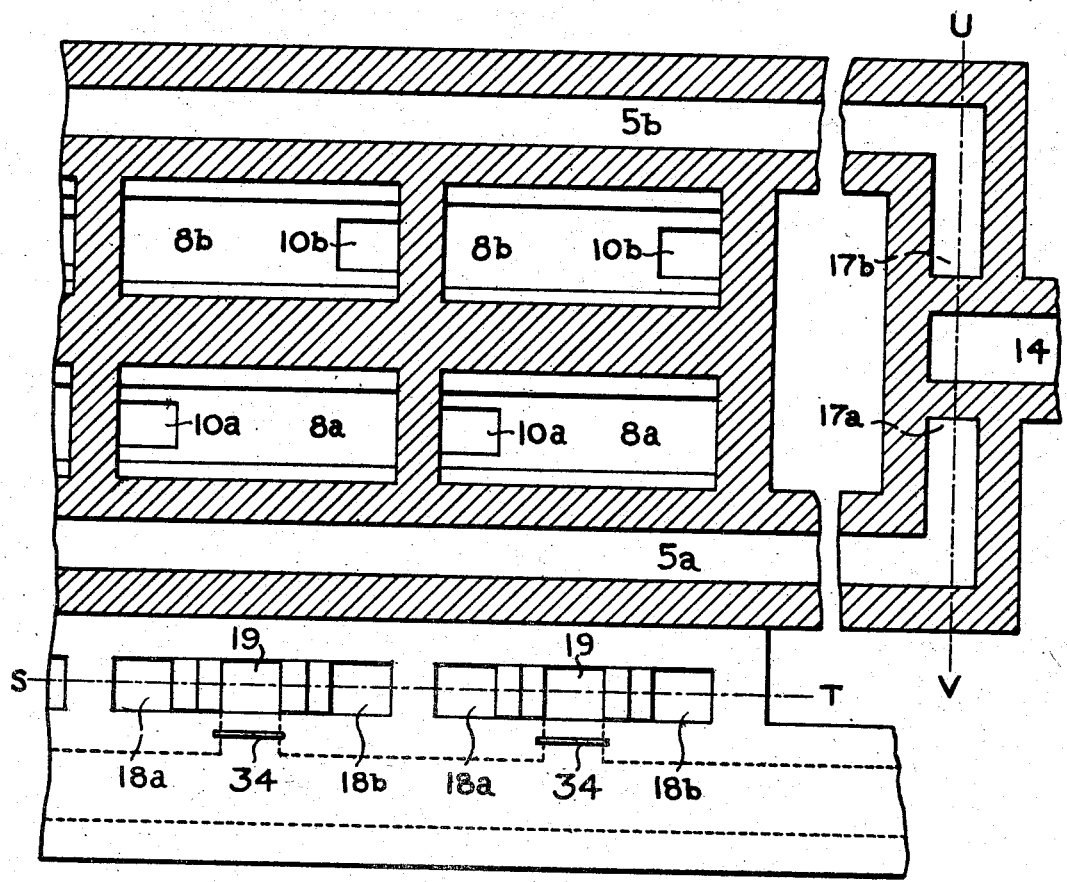

Referring to the valve for controlling the reversal of the air as will be seen from Figs. 4 and 4A which show two of these valves, one of which is provided for each double compartment, the passages 10ª and 10ᵇ of each compartment open into chambers 18ª and 18ᵇ on each side of the valve chamber, which chamber also contains a central passage 19, which is in communication through the channel or passage 20 with the chimney, see Figs. 1 and 3. 21 is a pivoted valve, by means of which the channel 18ª or 18ᵇ can be put into communication with an opening 22 opening into the air. At the same time the pivoted valve 21 causes the passage 18ª or 18ᵇ not put into communication with the air, to be put into communication with the passage 19 leading to the chimney.

In Fig. 4 the valve 21 is so set that the passage 18ª is in communication with the air, while the passage 18ᵇ is in communication with the passage 19. 23 is a cover which can be raised and lowered and secured in an appropriate position, for instance by means of a cord 24 passing over pulleys so that the supply of air may be regulated, or cut off entirely if desired.

All the valves 21 are so arranged that they may be thrown over or reversed by the operation of a single rod 25 extending along the side of the furnace.

This rod 25 may be operated by any appropriate mechanism, such for instance as the lever mechanism shown at Fig. 4A, where 26 is a pivoted lever provided with a weight. This lever 26 has an arm 27 jointed to a rod 28, which is in turn jointed to an arm 29, having rigidly connected thereto in any suitable manner another arm 30 in such a way that when the motion is transmitted from the operating handle 26 through the mechanism to the arm 30, the rod 25 is slid longitudinally, causing the valves which it controls through a suitable arm in connection with each valve, to be thrown over. Each of the valves is preferably mounted upon a spindle passing through to the outside, where a counterbalanced lever is furnished which is operated from the rod 25.

The lever mechanism for controlling the air valves and the gas valves are preferably mounted side by side so that the man in charge of the furnace can operate them practically simultaneously or in some cases, where found desirable the operating mechanisms may be interconnected.

The general working of the furnace will be readily understood.

The crucibles c to any required number are inserted into the compartments on each side of the central wall 3 and closed in, in the ordinary way and the furnace is started. Supposing the valve for the admission of gas is set in the position shown in full line at Fig. 5; the gas entering through the passage 14 passes as indicated by the arrow through the passage 17ª thence to the passage 5ª Fig. 1 thence to the small passage or chimney 6ª and so to the mixing or combustion chamber 7ª. At the same time air entering above the valve 21, Fig. 4, passes to the passage 18ª, thence to the passage 10ª through the regenerator 8ª and up the passage 9ª to the mixing or combustion chamber 7ª, where it mixes with the gas and combustion takes place. The heated gases and products of combustion pass up between the shelves or supports 11 and the crucibles in the upper part of the compartment on that side. They then pass over the top of the central wall 3 and down between the retorts c on the other side, into the chamber 7ᵇ. It must now be remembered that they cannot pass away by the passage 6ᵇ, as the passage 5ᵇ with which it communicates is closed owing to the position of the valve 16 Fig. 5. The gases and products of combustion therefore pass down through the regenerator 8ᵇ and up along the passage 10ᵇ see Fig. 3 and Fig. 4, from which they pass along the passage 18ᵇ to the passage 19 and thence to the passage 20 and to the chimney.

When it is required to reverse the furnace, the valve 16 is thrown over and also the valves 21, as previously explained and now the gas passes along the passage 5ᵇ on the other side of the furnace up through the corresponding passages 6ᵇ and so on, while the air passes through the passage 10ᵇ and so to the mixing chamber or combustion chamber 7ᵇ where combustion takes place the heated gases and products of combustion then passing over the central wall 3 in the opposite direction to that previously described and ultimately finding their way out to the chimney through the passages 10ᵃ, 18ᵃ, 19 and 20.

Figure 2:
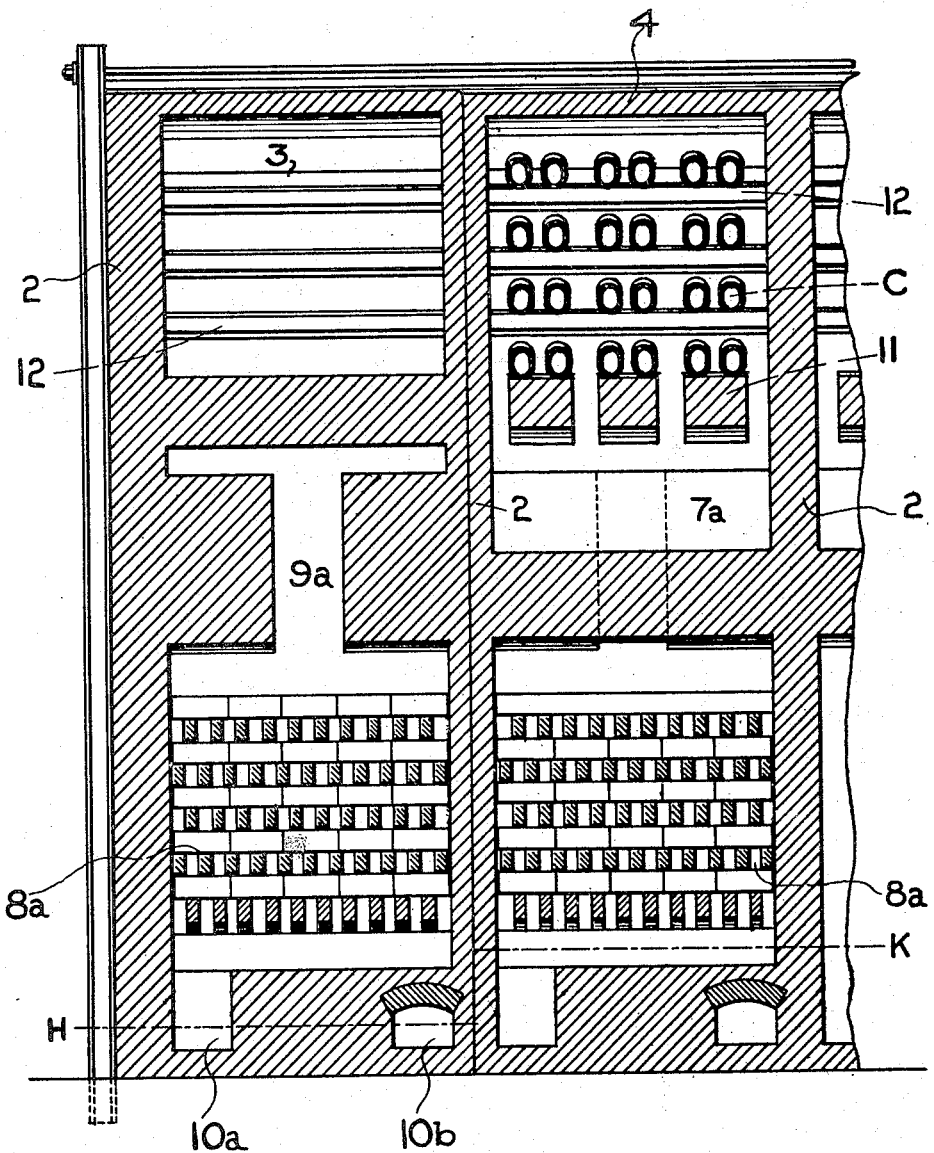

32, Fig. 2ᴬ are passages by means of which access can be obtained to the combustion chambers 7ᵃ, 7ᵇ, for the purposes of cleaning. This cleaning may be effected at suitable intervals say once a week. The openings of the passages are closed by means of a wall or in some other suitable manner.

33 are sliding shutters, by means of which the passages 6ᵃ, 6ᵇ for gas may be regulated or closed.

34 are other sliding shutters by means of which the opening from the valve chamber to the conduit leading to the chimney may be closed.

A furnace constructed as just described possesses many important advantages.

Owing to the fact that it consists of a number of double compartments—any of which (by closing the appropriate slides 33, cover 23 and slide 34) can be disconnected from the passages for the admission of gas and air, and that for the exit of the products of combustion—the furnace can be worked practically continuously as it is only necessary to disconnect or insulate any required compartment for repair or for other purposes.

As compared with reversible furnaces as at present constructed, the present furnace possesses the advantage that the heat to the crucibles can be more efficiently controlled, and whereas with other furnaces, some of the crucibles may become overheated, and others insufficiently heated, with my furnace they are subjected to a practically uniform degree of heat. The control is also extremely simple and effective. The reversal of both air and gas, as previously stated, may be effected simultaneously, especially where hydraulic mechanism is provided. For hand operation it is preferable to mount the lever controlling the gas valve close to that controlling the air valves, so that the furnace man can operate the two levers in rapid succession.

Owing to the fact that the burnt gases only return through the regenerator and only the air and not the gas passes through the heating chamber, the furnace works with great efficiency, there is very little resistance, the heating chamber remains clean, the draft is good and the temperature is maintained in a satisfactory manner. Moreover less destruction of the retorts, and consequent loss of zinc occurs than is the case with other furnaces. The heat is uniform from one end to the other and the difference of the output between the compartments is a minimum.

A further advantage of my furnace is that the crucibles may be all of the same length and dimensions, which is of considerable importance, as the use of retorts of different sizes is undesirable owing to differences in the amount of wear and durability.

It will be understood that the particular construction of the furnace may be varied considerably without departing from the principle of my invention.

The compartments may be of any desired size to accommodate any suitable number of rows of retorts, and any desired number of crucibles may be placed in each row.

The reversing valves may be of any desired construction and any appropriate mechanism may be employed for operating them.

What I claim and desire to secure by Letters Patent in the United States of America is:—

A furnace for treating zinc, comprising in combination two side walls, end walls and a vault or roof and transverse walls extending between the side walls and parallel to the end walls and a central wall parallel to the side walls and reaching nearly to the roof so that the body of the furnace is divided into a number of double compartments, the whole structure being of refractory material, a combustion chamber in each section of each compartment, a passage extending along and within each of the side walls, a valve chamber in connection with the side passages, the said chamber being provided with a single valve adapted to divert the gas into either of the before mentioned side passages, passages or flues opening from each of the side passages and leading to said combustion chambers, a regenerator in the lower section of each compartment, a separate air valve for each pair compartment, and passages for passing air in either direction through the pairs of compartments substantially as described.

In testimony whereof, I have hereunto subscribed my name.

LÉOPOLD VAN GULCK.

Witnesses:
 CECIL F. PAYNE,
 A. E. VIDAL.